United States Patent [19]

Godfrey, Jr. et al.

[11] 4,109,665
[45] Aug. 29, 1978

[54] DECORATED CIGAR WRAPPERS

[75] Inventors: Frederick D. Godfrey, Jr., Maplewood, N.J.; John J. Fedro, Wilkes-Barre, Pa.; Robert I. Sinclair, Mendham, N.J.

[73] Assignee: Consolidated Cigar Corporation, New York, N.Y.

[21] Appl. No.: 727,054

[22] Filed: Sep. 27, 1976

[51] Int. Cl.² .................. A24B 3/14; D21H 5/16
[52] U.S. Cl. ...................... 131/15 C; 131/140 C
[58] Field of Search ............. 131/15, 20 R, 20 A, 131/31; 101/32; 40/136; 156/57, 62.2, 157, 63, 163, 176, 209, 210, 219, 237, 277, 278

[56] References Cited
U.S. PATENT DOCUMENTS

| 267,764 | 11/1882 | Wood | 131/15 C |
| 2,316,785 | 4/1943 | Gladeck | 131/15 C |
| 3,526,231 | 9/1970 | Verbakel | 131/20 A |
| 3,534,743 | 10/1970 | Monte | 131/15 C |

Primary Examiner—Robert W. Michell
Assistant Examiner—V. Millin
Attorney, Agent, or Firm—Gregory J. Battersby; Charles I. Sherman; Thomas E. Harrison, Jr.

[57] ABSTRACT

A cigar wrapper is provided having opposed surfaces and a predetermined thickness, said wrapper having a vein-like pattern embossed through the thickness thereof resulting in a raised, vein-like pattern formed on one of the surfaces and a complimentary depressed vein-like pattern formed on the opposite surface. The one surface of the wrapper is treated with colorants to simulate a natural tobacco leaf, and the depressed vein-like pattern on the opposite surface is filled with a filler material. In a preferred embodiment, a second sheet of manufactured cigar wrapper material is laminated in juxtaposition to the opposite surface of the decorated sheet.

44 Claims, 7 Drawing Figures

DECORATED CIGAR WRAPPERS

RELATED APPLICATIONS

Cross-reference is made to concurrently filed U.S. patent application Ser. No. 727,052 filed on Sept. 27, 1976 in the names of Frederick D. Godfrey, Jr., John J. Fedro and Robert I. Sinclair entitled Method and Apparatus for Decorating Sheet Material.

BACKGROUND OF THE INVENTION

This invention relates generally to a decorated, manufactured cigar wrapper and, more particularly, to a manufactured cigar wrapper the surface of which has been treated with colorants in order to color and shade the surface having a raised, vein-like pattern embossed thereon to simulate a natural tobacco leaf.

Cigars typically are wrapped with a natural tobacco leaf or with a manufactured wrapper which contains both natural tobacco and certain adhesives and cellulosic fiber materials. The advantage of using a manufactured cigar wrapper rather than a natural tobacco leaf resides in its considerably lower cost and the increased ability to manipulate both taste and aroma by the addition of appropriate additives. The natural tobacco leaf has historically however, been the symbol of a quality cigar and accordingly, it has been a goal of cigar manufacturers to simulate the appearance of natural tobacco leaf wrappers on manufactured cigar wrappers.

To this end, cigar wrapper manufacturers have, on numerous occasions, attempted to print or draw a natural vein pattern on a sheet of manufactured wrapper material. For example, British Pat. No. 14,494, which issued to William Watson on Nov. 3, 1884, teaches the embossing, stamping or printing of natural tobacco leaf designs on manufactured tobacco paper. Simularly, U.S. Pat. No. 2,316,785, which issued to Frederick C. Gladeck on Apr. 20, 1943, discloses the embossing of a sheet of manufactured tobacco wrapper with a pattern which simulates leaf tobacco. See also, in this regard, U.S. Pat. No. 3,145,717 which issued to F. H. Osborne et al. on Aug. 25, 1964 and which discloses that calendering or embossing of a manufactured cigar wrapper with a leaf design having stems and veins.

A particular problem experienced by cigar wrapper manufacturers who have attempted to emboss or engrave such a veined pattern on a manufactured cigar wrapper is that during subsequent manufacturing operations and during use, especially when the humidity of the wrapper increases and the sheet is stretched, the raised, embossed vein pattern is stretched flat as the wrapper becomes taut and is thus removed. Further, prior art attempts at embossing or printing vein patterns on manufactured cigar wrappers have not heretofore been successful because the generally uniform color of the manufactured wrappers did not appear realistic when compared to the randomly colored natural tobacco leaf.

Against the foregoing background, it is a primary objective of the present invention to provide a manufactured cigar wrapper having an embossed, vein-like pattern on its outer surface.

It is another object of the present invention to provide a manufactured cigar wrapper having an embossed, vein-like pattern on its outer surface which retains its appearance during subsequent processing and use.

It is still another object of the present invention to provide a manufactured cigar wrapper having an embossed, vein-like pattern on its outer surface and which is colored and shaded to simulate a natural tobacco leaf.

It is yet another object of the present invention to provide a manufactured cigar wrapper having two layers of the same or different types of wrapper material laminated together.

It is a further object of the present invention to provide an economic and commercially acceptable cigar wrapper.

SUMMARY OF THE INVENTION

To the accomplishments of the foregoing objects and advantages, the present invention, in brief summary, comprises a decorated manufactured cigar wrapper which includes a first sheet having opposed upper and lower surfaces and a predetermined cross-sectional thickness. A vein-like pattern is embossed through the cross-sectional thickness of the first sheet creating a raised, vein-like pattern on the upper surface and a complimentary, depressed vein-like pattern on the lower surface. The lower surface is treated with colorants to simulate the coloring and shading of a natural tobacco leaf. The depressed vein-like pattern may be filled with a filler material applied to the lower surface of the sheet to reinforce the raised embossed pattern on the upper surface.

In a most preferred embodiment, a second sheet of manufactured cigar wrapper sheet material is laminated in juxtaposition to the lower surface of the first filled or unfilled sheet in order to prevent removal of the pattern embossed on the first sheet.

BRIEF DESCRIPTION OF THE DRAWINGS

The foregoing and still other objects and advantages of the present invention will be made apparent from the following detailed explanation of the preferred embodiments of the invention in connection with the accompanying drawings wherein.

DESCRIPTION OF THE PREFERRED EMBODIMENT

Figure 1:
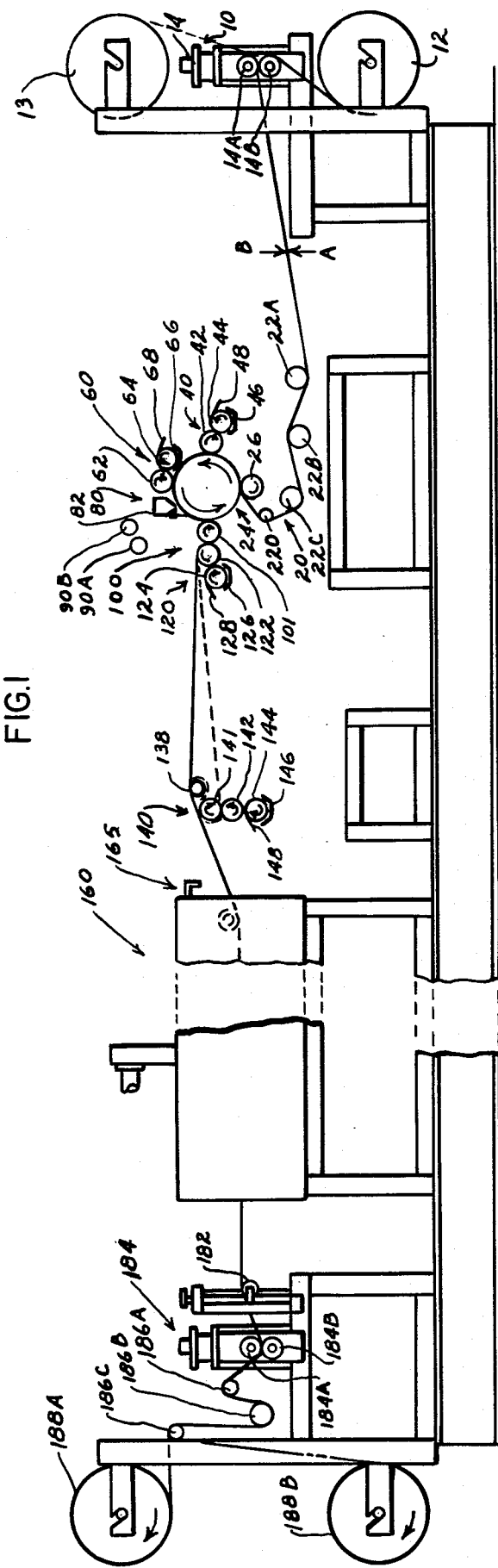
FIG. 1 illustrates, in schematic form, apparatus which may be used to decorate the manufactured cigar wrapper material of the present invention.
Figure 2:
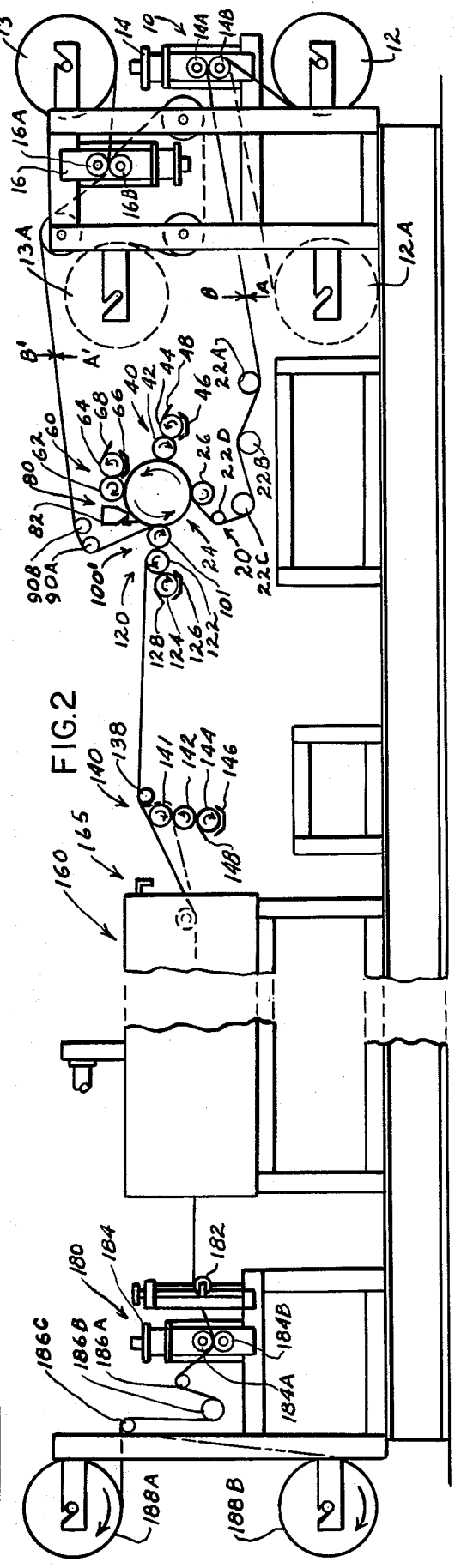
FIG. 2 illustrates, in schematic form, an alternate embodiment of the apparatus of FIG. 1 which may be used to decorate a sheet of manufactured cigar wrapper material and then laminate the decorated sheet to a second sheet of wrapper material.

The cigar wrapper of the present invention may be manufactured and decorated in a variety of ways, including, but not limited to, the preferred methods and apparatus of FIGS. 1 and 2, which are discussed in greater detail in previously noted, concurrently filed patent application Ser. No. 727,052, filed on Sept. 27, 1976 in the name of the same inventors. The subject matter of this concurrently filed application is expressly incorporated herein by this reference.

Referring to FIG. 1, one layer of manufactured cigar wrapper sheet material, preferably coated on at least one side A with a hydrophobic coating material such as, for example, a derivitized cellulases material, is processed through the decorating apparatus shown. The manufactured cigar wrapper sheet may be of a conventional composition, typically including ground tobacco, refined pulp and other adhesives, binders and fillers. The sheet is generally less than about 0.006 inches in thickness. The moisture level of the sheet material, prior to processing, should be above about 19% since the heat generated during processing may result in drying out of the sheet, thus making it more prone to tearing.

Still referring to FIG. 1, the wrapper is initially stored on both lower roll 12 and upper roll 13, in an unwind station 10, the free end of the wrapper from the roll 12 or 13 to be initially processed being first fed through a splicing unit 14 and then toward the embossing, coloring and shading stations 20, 40 and 60, respectively, which are positioned about a center cylinder 24. Splicing unit 14 permits the splicing of wrappers from the upper roll 13 and the lower roll 12 as a roll is depleted to insure continuous and uninterrupted operation. Take-up rollers 22A, 22B, 22C and 22D serve to guide the wrapper from the unwind station 10 toward and around center cylinder 24. As the wrapper passes through the nip between the center cylinder 24 and the embossing roller 26, a raised vein-like pattern, similar to the vein pattern of a natural tobacco leaf, is embossed at elevated temperature and pressure on and through the manufactured cigar wrapper sheet. The embossed wrapper then continues about the center cylinder 24 to a base color station 40 where a coloring agent is applied in a predetermined pattern to the wrapper. The wrapper then passes around the center cylinder 24 to the shade color station 60 where a shading agent of contrasting color to the coloring agent, is applied to the wrapper in a predetermined random or cloud-like pattern to simulate the random coloring of a natural tobacco leaf.

A reinforcing station 80 as shown in FIG. 1, is provided adjacent the center cylinder 24 to apply a filler material in either paste or powder to the uncoated side B of the wrapper to fill in the depressed portions of the embossed pattern, thus serving to prevent the vein-like pattern from being removed during processing and use. The decorated, colored and shaded cigar wrapper sheet is then removed from the center cylinder 24 at a removal station 100.

Still referring to FIG. 1, when desired, a secondary coating such as, for example, a hydrophobic coating may be applied to the wrapper, preferably after removal from the center cylinder 24, at a coating station 120 positioned adjacent the removal station 100.

A stain, preferably a vegetable oil stain, may be applied to the decorated cigar wrapper sheet at a staining station 140 as shown in FIG. 1. Stain serves to further delineate the vein-like pattern embossed on the cigar wrapper.

It is also preferable to apply a fine water spray to the wrapper and then pass the decorated cigar wrapper through a humidifier 160 prior to rewinding at a rewind station 180. By first wetting the wrapper and then passing it through a humidifier 160, where steam is sprayed by steam jets on the wrapper, the moisture level is raised to at least about 25% and preferably to between about 28% and about 35%.

FIG. 2 illustrates schematically a preferred method and apparatus for decorating a sheet or layer of manufactured cigar wrapper material and then laminating it to a second sheet or layer of wrapper material. In this embodiment, essentially the same apparatus is used as in the embodiment of FIG. 1 except that removal station 100 becomes laminating station 100' and a second set of rolls 12A and 13A are used in conjunction with upper and lower rolls 13 and 12, respectively, at the unwind station 10. In this embodiment, two generally thinner sheets of manufactured wrapper sheet material are used, the combined thickness of both sheets after lamination approximately equaling the thickness of the single sheet used in the embodiment of FIG. 1. The sheet from the upper rolls 13, 13A is coated on its side A' with a coating such as, for example, a hydrophobic coating, preferably including an additive, such as a glyceride, to lower the melting point below 400° F. The sheet from the lower rolls 12 and 12A is also coated on its oneside A with a coating similar to the coating on the sheet from upper rolls 13 and 13A, but without the additive to lower the melting point.

In the embossing of FIG. 2, the sheets from both the upper and lower rolls, of the unwind station 10 are fed simultaneously toward the center cylinder 24 with the wrapper from the lower rolls 12 and 12A being processed in a manner similar to the manner in which the sheet of FIG. 1 was processed. The sheet from the upper rolls 13 and 13A is fed over the top of the center cylinder 24 and is laminated to the previously decorated and colored wrapper at laminating station 100', preferably at a temperature of at least about 250° F. The laminated cigar wrapper then passes through the coating station 120, the staining station 140, the humidifier 160 and is rewound at rewind station 180, all in a manner similar to the method of FIG. 1.

Figure 3:
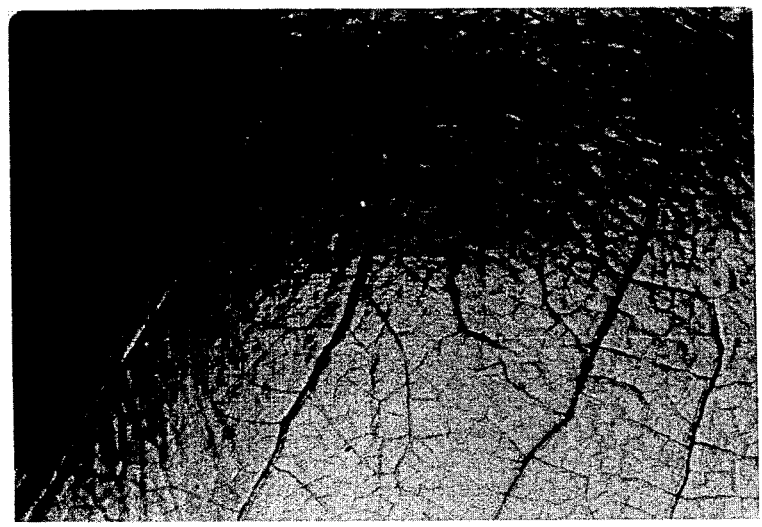
FIG. 3 is a photograph of a sheet of cigar wrapper material decorated using the apparatus of FIGS. 1 and 2.
Figure 3A:
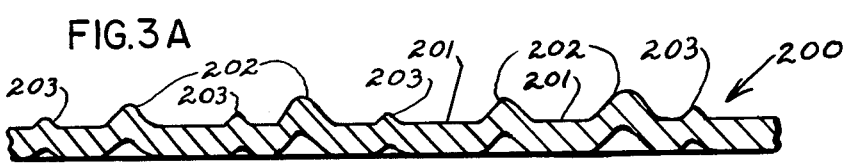
FIG. 3A is a partial cross-sectional view of a cigar wrapper decorated using the apparatus of FIGS. 1 and 2.
Figure 3B:
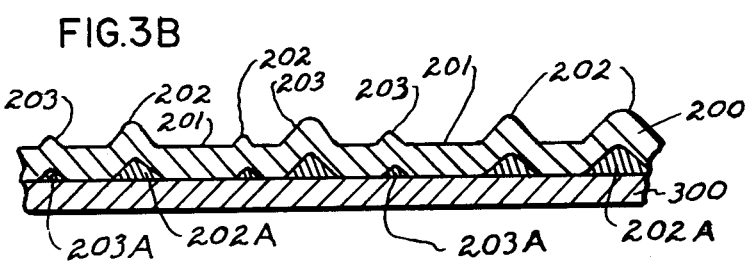
FIG. 3B is a partial cross-sectional view of a decorated and laminated cigar wrapper using the apparatus of FIG. 2.

The resultant embossed, colored and shaded cigar wrapper sheet is shown in FIGS. 3, 3A and 3B; FIG. 3 being a photograph of the decorated surface of the wrapper; FIG. 3A being a partial cross-sectional view of a non-laminated wrapper; and FIG. 3B being a partial cross-sectional view of a laminated wrapper having two layers of sheet material.

The cigar wrappers which are decorated in both the laminated and non-laminated embodiments of FIGS. 1 and 2 may be sheets of conventional, manufactured cigar wrapper material. In general, the sheets of manufactured cigar wrapper are a mixture of ground tobacco, refined pulp, filler materials, adhesives and other functional ingredients and preferably have a sheet weight within the range of from about 1.0 g/ft$^2$ to about 6.0 g/ft$^2$ and a moisture level of at least about 19%. The sheet of cigar wrapper material in the non-laminated embodiment of FIG. 3A preferably has a thickness of between about 0.002 inches and about 0.006 inches. While, in the laminated embodiment, of FIG. 3B, two layers of sheet material, each between about 0.001 inches to about 0.003 inches thick, are laminated together to produce a finished laminated sheet with a thickness of between about 0.002 inches and about 0.006 inches. In certain instances, it may be desirable to use sheets of differing thicknesses or compositions to achieve a desired result.

As shown in the photograph of FIG. 3, the cigar wrapper 200 has a raised vein-like pattern embossed on its coated surface A and is colored and shaded on uncoated surface B to simulate the appearance of a natural tobacco leaf. As shown best in FIGS. 3A and 3B, the vein-like pattern embossed on the sheet is raised from the coated outer surface of the wrapper 201. While the height of the raised vein pattern may vary widely, it has been found that a height for the main vein 202 of between about 0.010 and about 0.020 inches from the otherwise planar outer surface 201 most closely simulates the appearance of the main vein of a natural tobacco leaf and accordingly, such a height is preferred. A most preferred height for the main vein 202 is between about 0.014 and about 0.016 inches. Similarly, it has been found that the height of the smaller vein 203 should preferably be between about 0.002 and about 0.009 inches and, more preferably between about 0.004 and about 0.008 inches.

As shown in FIGS. 3A and 3B, the complimentary depressed portions of the vein-like pattern 202A and 203A on the uncoated side of the decorated sheet are preferably filled with a filler material in order to aid in reinforcing the raised, pattern on the outer surface 201 when the cigar wrapper is stretched taut and, particularly, when the moisture level of the wrapper increases above about 25%. Filler materials may either be in powder or paste form, the powder including a mixture of ground tobacco, binding agents and fillers including diatomaceous earths, clays and whitening agents. Preferred diatomaceous earths include the product marketed by Grefco, Inc. of Los Angeles, Ca. under the trademark Dicalite ® and the product marketed by Johns-Manville of Denver, Colo. under the mark Celite ®. Preferred clays include Bentonite ®, marketed by NL Industries, Inc. of New York, Kaolin and monmorillonite and preferred whitening agents, which serve to give the filled vein pattern a more natural, colored appearance, may be selected from the group consisting of titanium dioxide, calcium carbonate and dolomite. Flavoring and aromatic additives, coloring agents, preservatives, burn modifiers and ash improvers may also be incorporated in the filler materials.

As illustrated in the photograph of FIG. 3, the decorated cigar wrapper includes a base color which is applied to its uncoated surface B, and which is clearly visible from the opposite coated surface A. A random shade pattern of contrasting color is also applied to uncoated surface B and is also visible from coated surface A. The base color applied to the uncoated surface B is done with a coloring agent, including inks and dyes and, preferably selected from the group including carotenoids and annattos; food, drug and cosmetic dyes including the lake and solubilized forms; and other commercial food grade inks. A particularly preferred coloring agent is a mixture of an alcohol soluble cellulose ester and a pigment.

The shade color pattern is a second random color coating selectively applied to the uncoated surface B of the cigar wrapper using a shading agent. Preferred shading agents are drawn from the same class as the base coloring agents although the shading agent should be of a contrasting color to effect the random shade or cloud pattern.

As previously stated, the cigar wrapper may have either two layers of sheet material laminated together, as shown in FIG. 3B, or be a single-layered, non-laminated wrapper as shown in FIG. 3A. The two layered, laminated wrapper is preferable, since it further reinforces the embossed pattern and is thus more resistant to stretching and resultant obliteration of the embossed vein pattern. Additionally, the use of a laminated wrapper permits the use of layers of different types and thicknesses and provides the opportunity to create, by combining layers of different properties but having a symbiotic relationship with respect to one another, cigar wrappers having flavors, aromas and other physical properties such as strength, burn characteristics and surface appearances not heretofore possible from a single layered wrapper.

In the laminated wrapper of FIG. 3B, the second or laminating layer 300 is laminated to the decorated layer 200 on the uncoated side B of the decorated layer 200 which has the filled, depressed pattern. The laminating layer 300 is a second, undecorated sheet of manufactured cigar wrapper material. While in most cases, the laminating layer 300 is similar in all respects, except decoration, to the decorated sheet 200 to which it is laminated, it is forseen that layers of different thickness and/or composition may be laminated together. Lamination, which is generally accomplished at elevated temperature and pressure, results in the physical bonding of the decorated layer 200 to the laminating layer 300, wherein this physical bond is believed to be a cohesive bond or in the nature of a cohesive bond.

Figure 4:
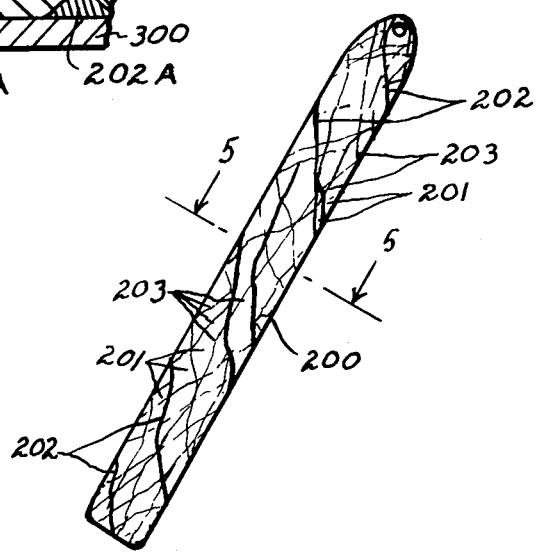
FIG. 4 illustrates a cigar having a decorated laminated cigar wrapper produced by means of the apparatus of FIG. 2.
Figure 5:
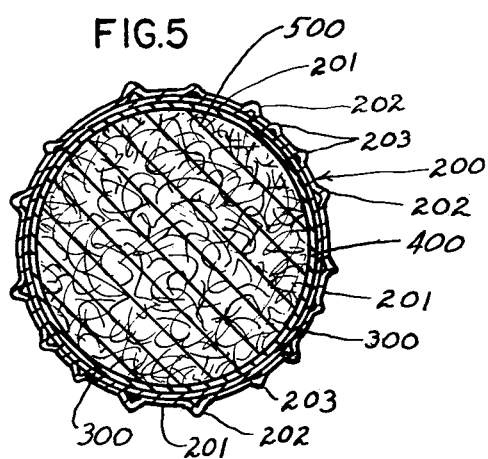
FIG. 5 is an enlarged cross-sectional view of the cigar of FIG. 4 taken along line 5—5 with exaggerated wrapper and binder thickness.

The cigar wrapper of FIG. 3 may then be wrapped around the binder 400 and the bunch portion 500 of a cigar in a conventional manner in order to produce the cigar of FIGS. 4 and 5.

In an alternate embodiment of the present invention (not shown), the decorated layer 200 is laminated directly to the binder 400, thus eliminating the need for this additional layer and wrapping step. Such an embodiment is particularly useful in high speed rod-making machines and a preferred application is in the manufacture of tipped cigars.

The following example serves to illustrate the present invention and should not be construed as limiting the scope of the invention.

EXAMPLE

In order to more clearly illustrate the properties of the decorated cigar wrapper of the present invention, a sheet of conventional manufactured cigar wrapper was decorated according to the present invention and laminated to a second sheet of conventional manufactured cigar wrapper. Each of the sheets used had a thickness of about 0.0015 inches, a tobacco content in excess of 65% and the following physical properties:

| LAMINATING SHEET (Prior to processing) | |
|---|---|
| dry long strength: | 540 g/in |
| dry transverse strength: | 135 g/in |
| Mullen strength: | 1.45 lb/in$^2$ |
| smoothness - top: | 25 seconds/25cc/in$^2$ |
| smoothness - bottom: | 32 seconds/25cc/in$^2$ |
| sheet weight: | 1.55 g./ft.$^2$ |
| sheet moisture: | 24.84% |

| DECORATING SHEET (Prior to processing) | |
|---|---|
| dry long strength: | 650 g/in |
| dry transverse strength: | 410 g/in |
| Mullen strength: | 1.95 lb/in$^2$ |
| smoothness - top: | 60 seconds/25cc/in$^2$ |

-continued

| DECORATING SHEET (Prior to processing) | |
|---|---|
| smoothness - bottom: | 100 seconds/25cc/in$^2$ |
| sheet weight: | 1.40 g/ft$^2$ |
| sheet moisture: | 25.30% |

The decorating sheet was coated on one surface with the following coating:

| Ingredients | Percent By Weight |
|---|---|
| cellulose-acetate-propionate | 10% |
| ethyl alcohol | 63% |
| ethyl acetate | 27% |

The laminating sheet was coated on one surface with the following coatings:

| Ingredients | Percent by Weight |
|---|---|
| cellulose-acetate-propionate | 5.0% |
| acetylated mono-glyceride | 5.0% |
| ethyl alcohol | 63.0% |
| ethyl acetate | 27.0% |

Each sheet was coated at a level of about 80 mg/ft$^2$ measured on a dry weight basis.

The laminating and decorating sheets were simultaneously processed through the apparatus of FIG. 2, the decorating sheet first having a raised, vein-like pattern embossed through its thickness at a pressure of 60 psi and at a temperature of 262° F.

Base color was applied at the base color station at a temperature of 80° F with an alcohol soluble ink and a shade color pattern was applied at a temperature of 84° F at the shade color station also using an alcohol soluble ink of a contrasting color to the base color. The decorating sheet was then laminated to the laminating sheet at a temperature of 281° F and at a pressure of 60 psi.

The resultant decorated, laminated cigar wrapper was humidified and rewound. Subsequent testing indicated that the wrapper had the following physical properties:

| dry long strength | 700 g/in |
|---|---|
| dry transverse strength | 330 g/in |
| Mullen strength | 1.65 lb/in$^2$ |
| smoothness - top | 80 seconds/25cc/in$^2$ |
| sheet weight | 3.38 g/ft$^2$ |
| sheet moisture | 30.4% |

The resultant decorated cigar wrapper, although being a manufactured cigar wrapper, had the appearance of a natural tobacco leaf and the physical properties of a commercially acceptable cigar wrapper.

The foregoing example is for illustrative purposes only and the invention is not to be limited except as set forth in the following claims.

Wherefore we claim:

1. A sheet of manufactured cigar wrapper material having opposed surfaces and a pre-determined cross-sectional thickness, said wrapper having a vein-like pattern embossed through said cross-sectional thickness to form a raised vein-like pattern on one of said opposed surfaces and a complimentary depressed vein-like pattern on said opposite surface, wherein the depressed pattern on said opposite surface is filled with a filler material in order to reinforce said embossed pattern.

2. The cigar wrapper of claim 1 wherein said filler material includes ground tobacco, binder agents and fillers selected from the group consisting o diatomaceous earths, clays and whitening agents.

3. The cigar wrapper of claim 1 wherein said filler material includes additives selected from the group consisting of flavoring aids, aromatic additives, coloring agents, burn modifiers, ash improvers and preservatives.

4. The cigar wrapper of claim 1 wherein said opposite surface includes a base color coating.

5. The cigar wrapper of claim 4 wherein said base coloring coating is effected by the application of a base coloring agent comprising a mixture of an alcohol soluble cellulose ester and a pigment.

6. The cigar wrapper of claim 1 wherein said opposite surface includes a selectively applied, random shade color coating.

7. The cigar wrapper of claim 6 wherein said shade coating is effected by the application of a shading agent comprising a mixture of an alcohol soluble cellulose ester and a pigment, said shading agent being of a contrasting color to said coloring agent.

8. The cigar wrapper of claim 1 wherein said one surface is coated with hydrophobic coating.

9. The cigar wrapper of claim 1 wherein said one surface is selectively stained with a vegetable oil based stain to further delineate said raised vein-like pattern.

10. The cigar wrapper of claim 1 further including a second sheet of manufactured cigar wrapper material laminated in juxtaposition to the opposite surface of said sheet material.

11. A manufactured cigar wrapper having opposed surfaces and a predetermined cross-sectional thickness, said cigar wrapper having a vein-like pattern embossed through said cross-sectional thickness to form a raised pattern on one of said opposed surfaces and a complimentary recessed pattern on said opposite surface, wherein said opposite surface includes a base color coating of a coloring agent, a random shade color coating of a shading agent and means for reinforcing said vein-like pattern added only within said recessed pattern.

12. The cigar wrapper of claim 11 wherein said means for reinforcing comprises the filling of the depressed pattern on said opposite surface with a filler material.

13. The cigar wrapper of claim 11 further including a second sheet which is cohesively laminated in juxtaposition to said opposite surface.

14. The cigar wrapper of claim 12 further including a second sheet of manufactured cigar wrapper material which is laminated in juxtaposition to said opposite surface.

15. The cigar wrapper of claim 13 wherein said second sheet is a sheet of manufactured cigar wrapper material.

16. The cigar wrapper of claim 15 wherein said second sheet of manufactured wrapper material has different properties than said cigar wrapper.

17. The cigar wrapper of claim 13 wherein said second sheet is a sheet of cigar binder material.

18. A decorated cigar wrapper comprising:
a first sheet of manufactured cigar wrapper material having opposed surfaces and a predetermined cross-sectional thickness, said wrapper having a vein-like pattern embossed through said cross-sectional thickness to form a raised, vein-like pattern on one of said opposed surfaces and a complimentary depressed vein-like pattern on said opposite surface; and a second sheet of manufactured cigar wrapper material cohesively laminated in juxtaposition to the opposite surface of said first sheet.

19. The cigar wrapper of claim 18 wherein the depressed pattern on the opposite surface of said first sheet is filled with a filler material in order to reinforce said embossed vein-like pattern.

20. The cigar wrapper of claim 19 wherein said filler material includes ground tobacco, binding agents, and fillers selected from the group consisting of diatomaceous earths, clays and whitening agents.

21. The cigar wrapper of claim 20 wherein said filler material includes additives selected from the group consisting of flavoring aids, aromatic additives, coloring agents, burn modifiers, ash improvers and preservatives.

22. The cigar wrapper of claim 18 wherein the opposite surface of said first sheet includes a base color coating of a pigmented, alcohol soluble cellulose ester.

23. The cigar wrapper of claim 22 wherein the opposite surface of said first sheet includes a random shade color coating of a pigmented, alcohol soluble, cellulose ester of a contrasting color to said base coloring coating.

24. The cigar wrapper of claim 18 wherein the one surface of said first sheet is coated with a hydrophobic coating.

25. The cigar wrapper of claim 18 wherein the one surface of said first sheet is stained with a vegetable oil based stain to further delineate the raised vein-like pattern.

26. The cigar wrapper of claim 18 wherein means are provided for reinforcing said vein-like pattern.

27. A decorated cigar wrapper comprising:
a first sheet of manufactured cigar wrapper material having opposed surfaces and a predetermined thickness, said wrapper having a vein-like pattern embossed through the thickness thereof to form a raised, vein-like pattern on one of said opposed surfaces and a complimentary depressed vein-like pattern on said opposite surface, said depressed vein-like pattern being filled with a filler material to reinforce said embossed vein-like pattern, wherein said opposite surface includes a base color coating of an alcohol soluble coloring agent and a random shade color coating of an alcohol soluble shading agent; and a second sheet laminated in juxtaposition to the opposite surface of said first sheet.

28. The cigar wrapper of claim 27 wherein said one surface is coated with a hydrophobic coating.

29. The cigar wrapper of claim 27 wherein said one surface is stained with a vegetable oil based stain to further delineate said raised vein-like pattern.

30. The cigar wrapper of claim 27 wherein said second sheet if of a different thickness than said first sheet.

31. The cigar wrapper of claim 27 wherein said second sheet had different physical properties than said first sheet.

32. The cigar wrapper of claim 27 wherein said second sheet is a sheet of binder material.

33. The cigar wrapper of claim 27 wherein said second sheet is a sheet of manufactured cigar wrapper material.

34. A cigar having a manufactured wrapper with opposed surfaces and a pre-determined cross-sectional thickness, said wrapper having a vein-like pattern embossed through said cross-sectional thickness to form a raised vein-like pattern on one of said opposed surfaces and a complimentary depressed vein-like pattern on said opposite surface, wherein the depressed pattern on said opposed surface is filled with a filler material in order to reinforce said embossed pattern.

35. A cigar having a manufactured wrapper with opposed surfaces and a predetermined cross-sectional thickness, said wrapper having a vein-like pattern embossed through said cross-sectional thickness to form a raised vein-like pattern on one of said opposed surfaces and a complimentary depressed vein-like pattern on siad opposite surface, wherein said opposite surface is colored and includes means for reinforcing said vein-like pattern added only within said recessed pattern.

36. The cigar of claim 35 wherein said opposite surface is colored by a coating of a coloring agent.

37. The cigar of claim 36 wherein said opposite surface includes a random shade color coating of a shading agent.

38. The cigar of claim 35 wherein said opposite surface includes a random shade color coating of a shading agent.

39. A cigar having a manufactured wrapper, said wrapper comprising:
a first sheet of manufactured wrapper material having opposed surfaces and a predetermined cross-sectional thickness, said wrapper having a vein-like pattern embossed through said cross-sectional thickness to form a raised, vein-like pattern on one of said opposed surfaces and a complimentary depressed vein-like pattern on said opposite surface; and a second sheet of manufactured wrapper material cohesively laminated in juxtaposition to the opposite surface of said first sheet.

40. A cigar having a manufactured wrapper, said wrapper comprising:
a first sheet of manufactured wrapper material having opposed surfaces and a predetermined cross-sectional thickness, said wrapper having a vein-like pattern embossed through said cross-sectional thickness to form a raised, vein-like pattern on one of said opposed surfaces and a complimentary depressed vein-like pattern on said opposite surface, wherein said opposite surface includes means to reinforce said embossed vein-like pattern; and a second sheet of manufactured wrapper material cohesively laminated in juxtaposition to the opposite surface of said first sheet.

41. The cigar of claim 40 wherein said means to reinforce comprises a filler material within said depressed vein-like pattern.

42. A cigar having a manufactured wrapper, said wrapper comprising:
a first sheet of manufactured wrapper material having opposed surfaces and a predetermined cross-sectional thickness, said wrapper having a vein-like pattern embossed through said cross-sectional thickness to form a raised, vein-like pattern on one of said opposed surfaces and a complimentary depressed vein-like pattern on said opposite surface, said depressed vein-like pattern being filled with a filler material to reinforce said embossed vein-like pattern, wherein said opposite surface includes a base color coating of an alcohol soluble coloring agent and a random shade color coating of an alcohol soluble shading agent; and a second sheet of manufactured wrapper material laminated in juxtaposition to the opposite surface of said first sheet.

43. A decorated cigar wrapper comprising:

a first sheet of manufactured cigar wrapper material having opposed surfaces and a predetermined cross-sectional thickness, said wrapper having a vein-like pattern embossed through said cross-sectional thickness to form a raised, vein-like pattern on one of said opposed surfaces and a complimentary recessed vein-like pattern on said opposite surface; and means for reinforcing said vein-like pattern added only within said recessed pattern; and a second sheet of manufactured cigar wrapper material laminated in juxtaposition to the opposite surface of said first sheet.

44. A cigar having a manufactured cigar wrapper, said wrapper comprising:

a first sheet of manufactured cigar wrapper material having opposed surfaces and a predetermined cross-sectional thickness, said wrapper having a vein-like pattern embossed through said cross-sectional thickness to form a raised, vein-like pattern on one of said opposed surfaces and a complimentary recessed vein-like pattern on said opposite surface and means for reinforcing said vein-like pattern added only within said recessed pattern; and a second sheet of manufactured cigar wrapper material laminated in juxtaposition to the opposite surface of said first sheet.

* * * * *